United States Patent
Morimura et al.

(10) Patent No.: US 10,049,579 B2
(45) Date of Patent: Aug. 14, 2018

(54) VEHICLE DRIVING ASSIST APPARATUS

(71) Applicant: TOYOTA JIDOSHA KABUSHIKI KAISHA, Toyota-shi, Aichi-ken (JP)

(72) Inventors: Junichi Morimura, Shizuoka-ken (JP); Teppei Ohta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/720,870

(22) Filed: Sep. 29, 2017

(65) Prior Publication Data
US 2018/0096604 A1    Apr. 5, 2018

(30) Foreign Application Priority Data
Oct. 3, 2016 (JP) .................. 2016-195794

(51) Int. Cl.
| | |
|---|---|
| B60Q 1/00 | (2006.01) |
| G08G 1/16 | (2006.01) |
| B60W 50/14 | (2012.01) |
| G01S 13/86 | (2006.01) |
| G01S 13/93 | (2006.01) |
| G06K 9/00 | (2006.01) |
| G06T 7/20 | (2017.01) |

(52) U.S. Cl.
CPC ............ *G08G 1/166* (2013.01); *B60W 50/14* (2013.01); *G01S 13/867* (2013.01); *G01S 13/931* (2013.01); *G06K 9/00805* (2013.01); *G06T 7/20* (2013.01); *B60W 2050/146* (2013.01)

(58) Field of Classification Search
CPC G08G 1/166; B60W 50/14; B60W 2050/146; G01S 13/867; G01S 13/931; G06K 9/00805; G06T 7/20
See application file for complete search history.

(56) References Cited

U.S. PATENT DOCUMENTS

| | | | | |
|---|---|---|---|---|
| 4,920,520 A | * | 4/1990 | Gobel .................. | G01S 15/931 367/909 |
| 6,947,064 B1 | * | 9/2005 | Hahn .................. | G08G 1/0962 345/427 |
| 2003/0108222 A1 | * | 6/2003 | Sato ....................... | H04N 7/183 382/104 |
| 2004/0105579 A1 | * | 6/2004 | Ishii ......................... | B60R 1/00 382/154 |
| 2005/0154505 A1 | * | 7/2005 | Nakamura ........... | G01C 21/365 701/1 |

(Continued)

FOREIGN PATENT DOCUMENTS

JP  2015-141490 A  8/2015

*Primary Examiner* — Quang D Pham
(74) *Attorney, Agent, or Firm* — Hunton Andrews Kurth LLP

(57) ABSTRACT

The vehicle driving assist apparatus of the invention provides a display device with an attention display command when an attention condition that a time predicted for a vehicle to reach a target is larger than a lower limit threshold time and smaller than or equal to a display start threshold time is satisfied. The lower limit threshold time is larger than or equal to a display time required for one attention display operation to be completed. The display start threshold time is larger than the lower limit threshold time. When the attention display condition is not satisfied, the apparatus does not provide the display device with the attention display command.

5 Claims, 8 Drawing Sheets

(56) References Cited

U.S. PATENT DOCUMENTS

| | | | | |
|---|---|---|---|---|
| 2007/0139523 | A1* | 6/2007 | Nishida | G08G 1/162 348/148 |
| 2009/0063036 | A1* | 3/2009 | King | A63G 7/00 701/408 |
| 2009/0128630 | A1* | 5/2009 | Kanaoka | H04N 5/23238 348/148 |
| 2009/0140845 | A1* | 6/2009 | Hioki | B60K 35/00 340/425.5 |
| 2012/0041632 | A1* | 2/2012 | Garcia Bordes | B60W 30/0953 701/29.1 |
| 2012/0299717 | A1* | 11/2012 | Yoshino | B60Q 5/008 340/466 |
| 2014/0072176 | A1* | 3/2014 | Orecher | G06K 9/00805 382/103 |
| 2014/0163859 | A1* | 6/2014 | Tsuchida | G01S 13/931 701/301 |
| 2015/0274162 | A1* | 10/2015 | Sato | B60W 10/04 701/23 |
| 2015/0344033 | A1* | 12/2015 | Fukuda | B60W 30/16 701/117 |
| 2016/0052394 | A1* | 2/2016 | Yamada | B60K 37/04 701/93 |
| 2016/0153380 | A1* | 6/2016 | Izumi | G08G 1/165 701/99 |
| 2016/0167580 | A1* | 6/2016 | Hanita | B60Q 9/008 701/301 |
| 2016/0272244 | A1* | 9/2016 | Imai | G08G 1/166 |
| 2016/0321920 | A1* | 11/2016 | Hayasaka | G08G 1/166 |
| 2017/0039855 | A1* | 2/2017 | Maeda | B60K 31/0008 |
| 2017/0060234 | A1* | 3/2017 | Sung | B60R 1/006 |
| 2017/0068248 | A1* | 3/2017 | Kobayashi | G05D 1/0246 |
| 2017/0102777 | A1* | 4/2017 | Kato | G06F 3/017 |
| 2017/0124788 | A1* | 5/2017 | Nishida | G07C 5/0866 |
| 2017/0146796 | A1* | 5/2017 | Kosaka | G02B 27/01 |
| 2017/0183007 | A1* | 6/2017 | Oh | B60W 30/16 |
| 2017/0199274 | A1* | 7/2017 | Sasabuchi | G01S 13/931 |
| 2017/0225617 | A1* | 8/2017 | Morimura | B60Q 9/008 |
| 2017/0259831 | A1* | 9/2017 | Hoshino | B60W 50/14 |
| 2018/0023972 | A1* | 1/2018 | Lei | G01C 21/3626 701/467 |

* cited by examiner

VEHICLE DRIVING ASSIST APPARATUS

CROSS-REFERENCE TO RELATED APPLICATION

The present application claims priority to Japanese Patent Application 2016-195794 filed on Oct. 3, 2016, which is incorporated herein by reference in its entirety.

BACKGROUND

Field of the Invention

The invention relates to a vehicle driving assist apparatus for performing an attention display operation with respect to a driver of a vehicle when the vehicle approaches an object such as a walking person or a standing person or a stopped bicycle which a person rides or a moving bicycle which a person rides.

Description of the Related Art

There is known a vehicle driving assist apparatus configured to detect an object such as a walking person around a vehicle with a radar or a stereo camera or the like and cause a display device to perform an attention display operation for informing the driver of the vehicle that the object exists around the vehicle when the vehicle approaches the object (for, example, see JP 2015-141490 A). Hereinafter, the known vehicle driving assist apparatus will be referred to as "the known apparatus".

When the attention display operation is performed, for example, by turning on arrow-shaped lights sequentially for informing the driver of a direction in which the object approaches the vehicle, it takes a predetermined display time for completing one attention display operation.

In this regard, the object may be behind a building. In addition, a moving direction of the object may change suddenly. In these cases, when the vehicle approaches the object considerably, the object may be first realized as a target required to draw a driver's attention. In this case, when the known apparatus realizes the object as the target and starts to perform the attention display operation, the attention display operation may continue to be performed after or just before the vehicle passes the target because the known apparatus is configured to take the predetermined display time for completing one attention display operation. In this case, the driver is likely to feel a discomfort.

The invention has been made for solving the problem described above. An object of the invention is to provide a vehicle driving assist apparatus capable of performing the attention display operation for informing the driver of an existence of the target with less discomfort of the driver.

SUMMARY OF THE INVENTION

The vehicle driving assist apparatus according to the invention comprises an object detection device (14R, 14F, 14L, 15), a display device (41) and an electric control unit (10, 20, 30, 40, 50). The object detection device (14R, 14F, 14L, 15) detects an object (105 existing around a vehicle (100) and acquires object information corresponding to information on a position and a speed of the object (105) with respect to the vehicle (100). The display device (41) performs an attention display operation for informing a driver of the vehicle (100) of an existence of a target corresponding to the object (105) to be informed a driver of the vehicle (100). It takes a predetermined display time (Ttotal) for completing one attention display operation. The electric control unit (10, 20, 30, 40, 50) provides the display device (41) with an attention display command for causing the display device (41) to perform the attention display operation.

The electric control unit (10, 20, 30, 40, 50) determines whether the target (105) exists around the vehicle (100), using the object information (see a process of a step 715 of FIG. 7). When the electric control unit (10, 20, 30, 40, 50) first determines that the target (105) exists around the vehicle (100) (see a determination "Yes" at the step 715), the electric control unit estimates a predicted reaching time (TTC) necessary for the vehicle (100) to reach the target (105), using the object information (see a process of a step 720 of FIG. 7).

When an attention condition that the predicted reaching time (TTC) is larger than a lower limit threshold time (TTClow) and smaller than or equal to a display start threshold time (TTC1) is satisfied (see a determination "Yes" at a step 725 of FIG. 7), the electric control unit provides the display device (41) with the attention display command (see a process of a step 730 of FIG. 7). In this regard, the lower limit threshold time (TTClow) is larger than or equal to the predetermined display time (Ttotal). The display start threshold time (TTC1) is larger than the lower limit threshold time (TTClow). Thereby, when the predicted reaching time is relatively short, the driver can be informed of the existence of the target around the vehicle.

On the other hand, when the attention display condition is not satisfied (see a determination "No" at the step 725), the electric control unit does not provide the display device (41) with the attention display command.

If the attention display operation starts to be performed when the predicted reaching time is shorter than the predetermined display time, i.e., a time of duration of the attention display operation, the attention display operation continues to be performed after the vehicle passes the target. In addition, if the attention display operation starts to be performed when the predicted reaching time is insufficiently longer than the time of duration of the attention display operation, the attention display operation may continue to be performed just before the vehicle passes the target. In these cases, the driver may feel the discomfort.

According to the invention, when the predicted reaching time is shorter than the lower limit threshold time larger than or equal to the predetermined display time and smaller than the display start threshold time even though the predicted reaching time is shorter than or equal to the display start threshold time, the attention display command is not provided to the display device and thus, the attention display operation is not performed. Therefore, the attention display operation is unlikely to continue to be performed after or just before the vehicle passes the attention target. Thus, the driver is unlikely to feel the discomfort.

According to an aspect of the invention, the attention condition may include a condition that a lateral distance (DL) between the target (105) and a line (LC) extending in a longitudinal direction of the vehicle (100) is shorter than or equal to a display start threshold distance (DL1) (see a process of the step 725). In this case, the electric control unit (10, 20, 30, 40, 50) may be configured to determine whether the lateral distance (DL) is shorter than or equal to the display start threshold distance (DL1), using the object information.

When the lateral distance is large, the necessity of drawing the driver's attention to the target, is small. Therefore, when the attention display operation is performed while the lateral distance is large, the driver may feel a troublesomeness. According to the aspect of the invention, the attention condition includes the condition that the lateral distance is smaller than or equal to the display start threshold distance. Therefore, the attention display operation is performed only when the necessity of drawing the driver's attention to the target, is large. Thereby, the driver is unlikely to feel the troublesomeness.

According to another aspect of the invention, the electric control unit (10, 20, 30, 40, 50) may be configured to determine whether a forced-braking condition that the predicted reaching time (TTC) is shorter than or equal to a forced-braking start threshold time (TTC3) shorter than the display start threshold time (TTC1), using the object information (see a process of a step 835 of FIG. 8). In this case, when the electric control unit determines that the forced-braking condition is satisfied (see a determination "Yes" at the step 835), the electric control unit may be configured to perform a forced-braking operation for causing a braking device (31, 32) of the vehicle (100) to apply a braking force to the vehicle (100) to stop the vehicle (100) (see a process of a step 840 of FIG. 8).

According to this aspect, when the vehicle approaches the target considerably, the braking force is applied to the vehicle, thereby stopping the vehicle. Thus, the vehicle is prevented from colliding against the target.

According to further another aspect of the invention, the forced-braking condition may include a condition that the lateral distance (DL) is shorter than or equal to a forced-braking start threshold distance (DL3) shorter than the display start threshold distance (DL1) (see the process of the step 835). In this case, the electric control unit (10, 20, 30, 40, 50) may be configured to determine whether the lateral distance (DL) is shorter than or equal to the forced-braking start threshold distance (DL3), using the object information.

When the lateral distance is large, a possibility that the vehicle collides against the target, is small. Therefore, if the braking force is applied to the vehicle and as a result, the vehicle is stopped when the lateral distance is large, the driver may feel the troublesomeness. According to the aspect of the invention, the forced-braking condition includes the condition that the lateral distance is smaller than or equal to the forced-braking start threshold distance. Therefore, only when the necessity of stopping the vehicle by applying the braking force to the vehicle, is large, the braking force is applied to the vehicle to stop the vehicle. Thus, the driver is unlikely to feel the troublesomeness.

According to further another aspect of the invention, the electric control unit (10, 20, 30, 40, 50) may be configured to continue to perform the attention display operation until the vehicle (100) stops when the forced-braking operation is performed (see a determination "Yes" at a step 735 of FIG. 7) even though the attention condition becomes unsatisfied (see a determination "No" of the step 715) after the attention display operation starts to be performed.

When the forced braking operation is performed, a necessity of drawing the driver's attention the target, is small. Therefore, in this case, even when the attention condition becomes unsatisfied, it is preferred to continue the attention display operation. In this regard, when the necessity of drawing the driver's attention is large, the driver's attention can be drawn by continuing the attention display operation until the vehicle is stopped by the forced-braking operation.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
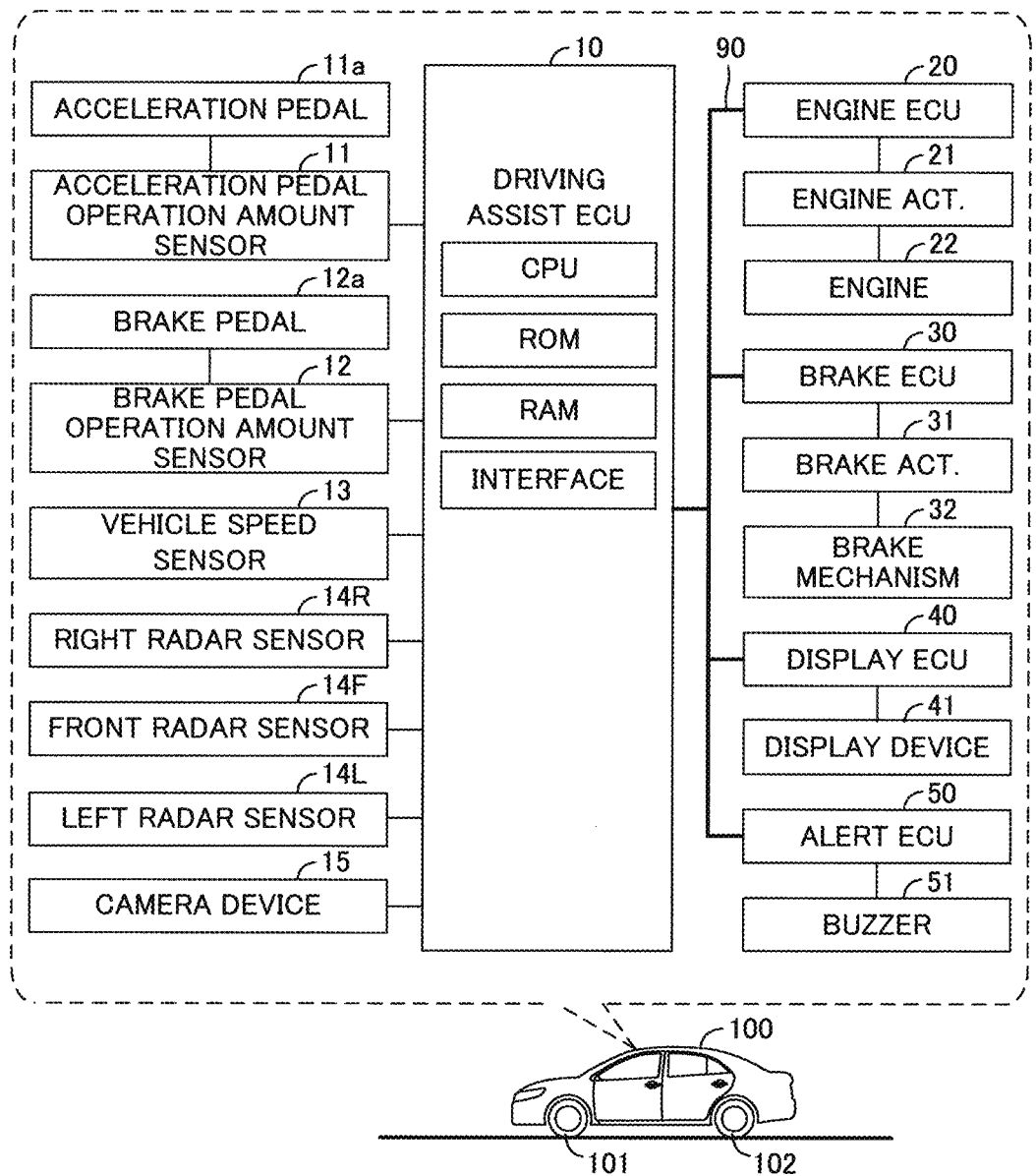
FIG. 1 is a view for showing an embodiment apparatus corresponding to a vehicle driving assist apparatus according to an embodiment of the invention.

Below, with reference to the drawings, a vehicle driving assist apparatus according to an embodiment of the invention will be described. Hereinafter, the vehicle driving assist apparatus according to the embodiment will be referred to as "the embodiment apparatus". The embodiment apparatus is applied to a vehicle 100 shown in FIG. 1. The embodiment apparatus includes a driving assist ECU 10, an engine ECU 20, a brake ECU 30, a display ECU 40 and an alert ECU 50.

The ECU is an electric control unit. Each of the ECUs 10, 20, 30, 40 and 50 is an electronic control circuit which has a micro-computer as a main component. The micro-computer includes a CPU, a ROM, a RAM, an interface and the like. The CPU realizes various functions described later by executing instructions or routines stored in a memory such as the ROM. Some of the ECUs 10, 20, 30, 40 and 50 may be integrated into one ECU.

The ECUs 10, 20, 30, 40 and 50 are electrically connected to each other such that the ECUs 10, 20, 30, 40 and 50 can send and receive data to and from, i.e., communicate with each other via a communication/sensor system CAN (i.e., Controller Area Network) 90.

The vehicle 100 includes an acceleration pedal operation amount sensor 11, a brake pedal operation amount sensor 12, a vehicle speed sensor 13, a right radar sensor 14R, a front radar sensor 14F, a left radar sensor 14L and a camera device 15. The sensors 12, 13, 14R, 14F and 14L and the camera device 15 are electrically connected to the driving assist ECU 10. Any of the sensors 12, 13, 14R, 14F and 14L and the camera device 15 may be electrically connected to any of the ECUs 20, 30, 40 and 50 other than the driving assist ECU 10. In this case, the driving assist ECU 10 receives from the ECU(s) electrically connected to any of the sensors 12, 13, 14R, 14F and 14L and the camera device 15 via the CAN 90, the signal(s) and the like output from any of the sensors 12, 13, 14R, 14F and 14L and the camera device 15.

The acceleration pedal operation amount sensor 11 detects an acceleration pedal operation amount corresponding to an operation amount AP of an acceleration pedal 11a and outputs a signal indicating the acceleration pedal operation amount AP to the driving assist ECU 10. The driving assist ECU 10 acquires the acceleration pedal operation amount AP on the basis of the signal received from the acceleration pedal operation amount sensor 11.

The brake pedal operation amount sensor 12 detects a brake pedal operation amount corresponding to an operation amount BP of a brake pedal 12a and outputs a signal indicating the brake pedal operation amount BP to the driving assist ECU 10. The driving assist ECU 10 acquires the brake pedal operation amount BP on the basis of the signal received from the brake pedal operation amount sensor 12.

The vehicle speed sensor 13 detects a vehicle speed corresponding to a traveling speed V of the vehicle 100 and outputs a signal indicating the vehicle speed V to the driving assist ECU 10. The driving assist ECU 10 acquires the vehicle speed V on the basis of the signal received from the vehicle speed sensor 13.

Figure 2:
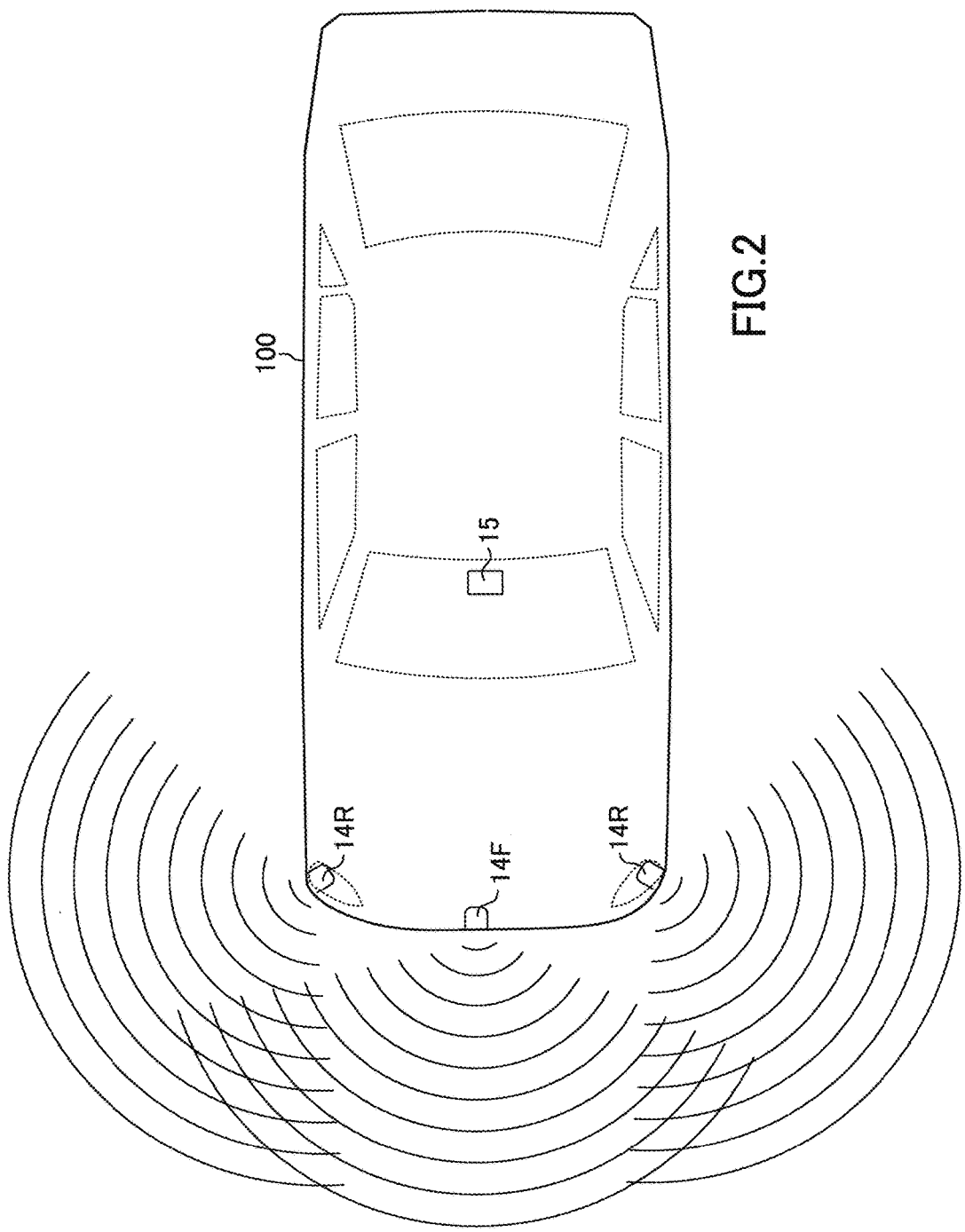
FIG. 2 is a view for showing a vehicle to which the embodiment apparatus is applied.

As shown in FIG. 2, the right radar sensor 14R is provided on a right front end of the vehicle 100. The right radar sensor 14R transmits a millimeter wave diagonally forward right from the vehicle 100. When an object such as a walking person or a standing person or a moving bicycle which a person rides or a stopped bicycle which a person rides or the like exists within a reachable range of the millimeter wave transmitted from the right radar sensor 14R, the transmitted millimeter wave is reflected by the object. The right radar sensor 14R receives the reflected millimeter wave. The right radar sensor 14R outputs data D14r regarding the transmitted and reflected millimeter waves to the driving assist ECU 10 as radar sensor information.

The front radar sensor 14F is provided on a front center end of the vehicle 100. The front radar sensor 14F transmits a millimeter wave forward straight from the vehicle 100. When the object exists within a reachable range of the millimeter wave transmitted from the front radar sensor 14F, the transmitted millimeter wave is reflected by the object. The front radar sensor 14F receives the reflected millimeter wave. The front radar sensor 14F outputs data D14f regarding the transmitted and reflected millimeter waves to the driving assist ECU 10 as the radar sensor information.

The left radar sensor 14L is provided on a front left end of the vehicle 100. The left radar sensor 14L transmits a millimeter wave diagonally forward left from the vehicle 100. When the object exists within a reachable range of the millimeter wave transmitted from the left radar sensor 14L, the transmitted millimeter wave is reflected by the object. The left radar sensor 14L receives the reflected millimeter wave. The left radar sensor 14L outputs data D14l regarding the transmitted and reflected millimeter waves to the driving assist ECU 10 as the radar sensor information.

The camera device 15 includes a stereo camera (not shown) and an image processing part (not shown). The stereo camera takes an image of a landscape at a diagonally forward left area from the vehicle 100 and an image of a landscape at a diagonally forward right area from the vehicle 100. The image processing part processes the images taken by the stereo camera to acquire image data and outputs the acquired image data to the driving assist ECU 10 as the camera image information.

The engine ECU 20 is electrically connected to engine actuators 21. The engine actuators 21 change an operation state of an internal combustion engine 22. In this embodiment, the engine 22 is a gasoline-fuel-injection spark-ignition multi-cylinder engine. The engine 22 includes a throttle valve for adjusting an intake air amount corresponding to an amount of air flowing into combustion chambers (not shown) of the engine 22, fuel injectors for injecting fuel to be supplied to the combustion chambers and the like. The engine actuators 21 include throttle valve actuator for adjusting an opening degree of the throttle valve and fuel injector actuators for causing the fuel injectors to inject the fuel.

The engine ECU 20 can change a torque generated by the engine 22 by controlling the engine actuators 21. Hereinafter, the torque generated by the engine 22 will be referred to as "the engine torque". The engine torque is transmitted to front left and right driving wheels 101 via a transmission (now shown) of the vehicle 100. Therefore, the engine ECU 20 can change an acceleration of the vehicle 100 by controlling the engine actuators 21.

The brake ECU 30 is electrically connected to brake actuators 31. The brake ECU 30 can change friction braking forces applied by a hydraulic brake mechanism 32 to the front left and right driving wheels 101 and rear left and right wheels 102 of the vehicle 100 by controlling the brake actuators 31. Therefore, the brake ECU 30 can change a deceleration of the vehicle 100 by controlling the brake actuators 31.

Figure 3:
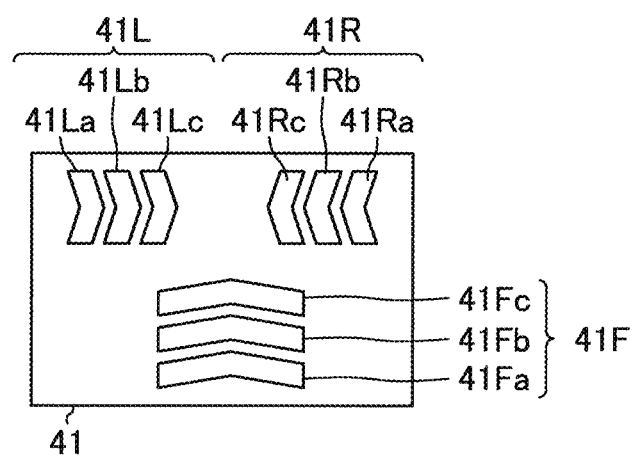
FIG. 3 is a view for showing a display device of the embodiment apparatus.

A display device 41 is provided in place (for example, in a meter cluster panel) such that a driver of the vehicle 100 sitting on a driver's seat can see the display device 41. As shown in FIG. 1, the display device 41 is electrically connected to the display ECU 40. As shown in FIG. 3, the display device 41 includes a left display part 41L, a right display part 41R and a front display part 41F.

The left display part 41L includes a first display part 41La, a second display part 41Lb and a third display part 41Lc. The first to third display parts 41La to 41Lc are turned on and off in response to a command sent from the display ECU 40, respectively.

The right display part 41R includes a first display part 41Ra, a second display part 41Rb and a third display part 41Rc. The first to third display parts 41Ra to 41Rc are turned on and off in response to a command sent from the display ECU 40, respectively.

The front display part 41F includes a first display part 41Fa, a second display part 41Fb and a third display part 41Fc. The first to third display parts 41Fa to 41Fc are turned on and off in response to a command sent from the display ECU 40, respectively.

As shown in FIG. 1, a buzzer 51 is electrically connected to the alert ECU 50. The buzzer 51 generates an alert sound for drawing a driver's attention in response to a command sent from the alert ECU 50.

<Summary of Operation of Embodiment Apparatus>

Below, a summary of an operation of the embodiment apparatus will be described. The embodiment apparatus acquires a direct distance between the vehicle 100 and the object existing around the vehicle 100, a relative speed of the object with respect to the vehicle 100, a lateral distance DL described later, a relative lateral speed of the object with respect to the vehicle 100 and the like as object information corresponding to information on the object on the basis of the radar sensor information and the camera image information each time a predetermined time elapses. The object information indicates a relationship between the vehicle 100 and the object, i.e., corresponds to information on a position and a speed of the object with respect to the vehicle 100. The driving assist ECU 10 is configured to determine the object information by integrating the radar sensor information and the camera image information.

The embodiment apparatus uses the object information to determine whether a target corresponding to the object required to perform an attention display operation described later, exists. In particular, the embodiment apparatus calculates, on the basis of the object information, an object existence probability corresponding to a probability that the object information shows the object and determines whether the probability is larger than or equal to a threshold probability. The object existence probability can be calculated, using known techniques described, for example, in JP 2014-006123 A, JP 2013-145205 A and JP 2011-257984 A.

When the object existence probability is larger than and equal to the threshold probability, the embodiment apparatus determines, on the basis of the camera image information, whether the object is any of a person who walks or stands (hereinafter, the walking and standing persons will be collectively referred to as "the walking person") and a moving or stopped bicycle which a person rides (hereinafter, the moving and stopped bicycle will be collectively referred to as "the moving bicycle"). In this embodiment, this determination is realized by the known pattern matching technique on the basis of the camera image information.

Figure 4:
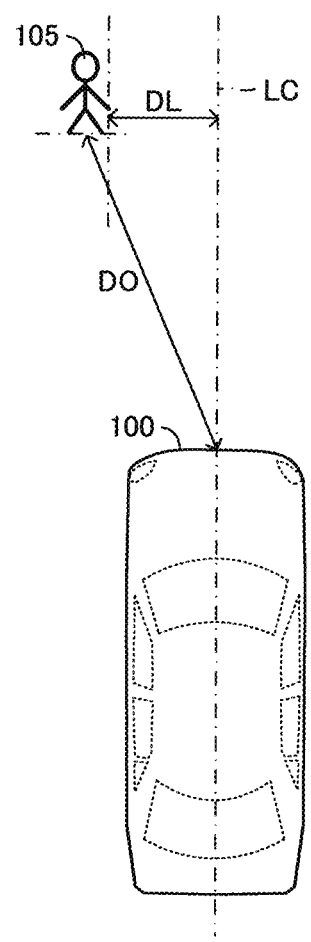
FIG. 4 is a view used for describing a lateral distance.

When the object is the walking person or the moving bicycle, the embodiment apparatus determines whether the lateral distance DL of the object is smaller than or equal to a predetermined threshold distance DLth. As shown in FIG. 4, the lateral distance DL is a distance between the object (in FIG. 4, the walking person 105) and a line LC extending longitudinally along a center line of a width of the vehicle 100. When the lateral distance DL is smaller than or equal to the predetermined threshold distance DLth, the embodiment apparatus acquires a position of the object, a moving direction of the object, a moving speed of the object and the like with respect to the vehicle 100 on the basis of the object information.

The embodiment apparatus calculates a collision probability that the vehicle 100 collides against the object on the basis of the acquired position, moving direction, moving speed and the like of the object and determines whether the calculated collision probability is larger than or equal to a threshold probability. The collision probability can be calculated, using known techniques, for example, described in JP 2015-024713 A, JP 2014-139756 A, JP 2012-234407 A, JP 4026400 B. When the collision probability is larger than or equal to the threshold probability, the embodiment apparatus sets the object as an attention target required to perform the attention display operation. Then, the embodiment apparatus identifies whether the attention target exists ahead of the vehicle 100 on the right or ahead of the vehicle 100 on the left or in front of the vehicle 100, using the object information.

When the embodiment apparatus sets the object as the attention target, the embodiment apparatus acquires a target in-between time TTC by dividing a distance DO between the vehicle 100 and the attention target 105 by the vehicle speed V (i.e., TTC=DO/V). The target in-between time TTC is a predicted reaching time corresponding to a time predicted to be required for the vehicle 100 to reach the attention target 105.

The embodiment apparatus determines whether an attention display condition that the target in-between time TTC is shorter than or equal to a first threshold time TTC1 (i.e., a display start threshold time) and the lateral distance DL is shorter than or equal to a first threshold distance DL1 (i.e., a display start threshold distance) shorter than the predetermined threshold distance DLth, is satisfied. When the attention display condition is satisfied, the embodiment apparatus performs the attention display operation for informing the driver of the vehicle 100 of an existence of the attention target 105 around the vehicle 100 as described below.

<Attention Display Operation>

Figure 5:
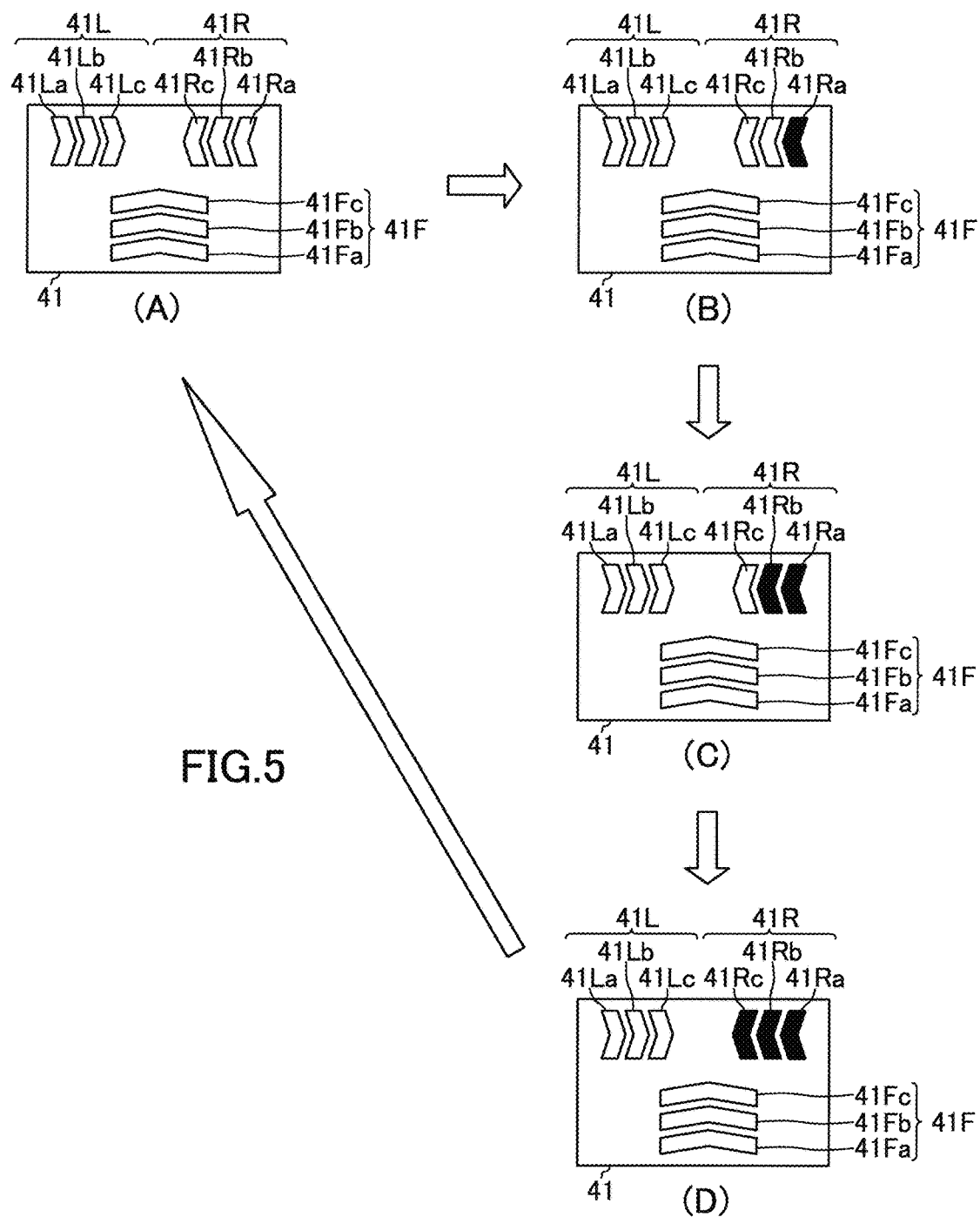
FIG. 5 is a view used for describing an activation of the display device of the embodiment apparatus.
Figure 6:
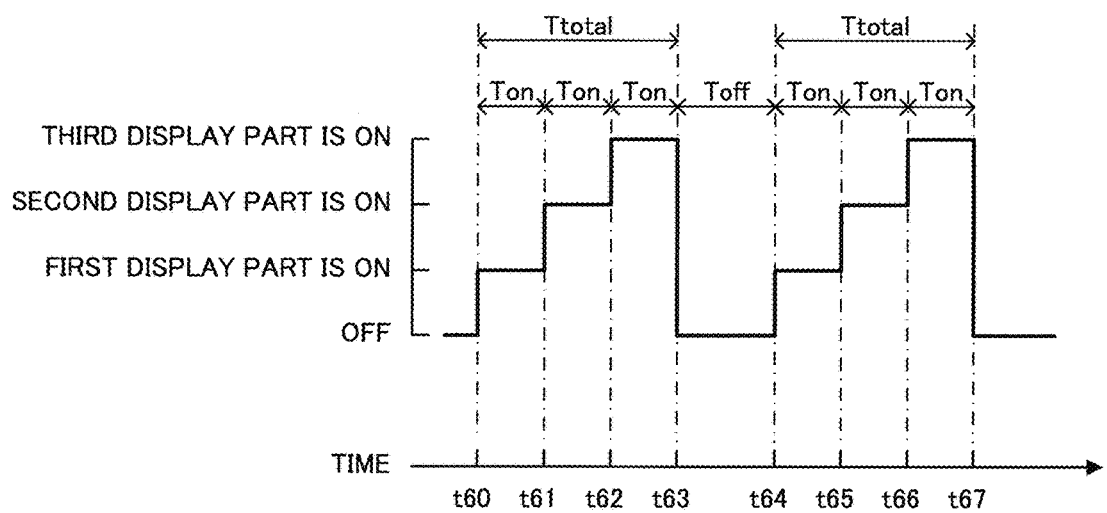
FIG. 6 is a view for showing a time chart used for describing the activation of the display device of the embodiment apparatus.

As shown in FIG. 6, at a time t60 when the attention display condition is satisfied for the attention target existing ahead of the vehicle on the right, the embodiment apparatus starts to perform the attention display operation by starting a lighting of the first display part 41Ra of the right display part 41R as shown in FIG. 5(B). It should be noted that the first to third display parts 41Ra to 41Rc of the right display part 41R is turned off as shown in FIG. 5(A) before the attention display operation starts to be performed.

As shown in FIG. 6, at a time t61 when a predetermined time Ton elapses from the time t60 of starting the lighting of the first display part 41Ra, the embodiment apparatus starts a lighting of the second display part 41Rb while continuing the lighting of the first display part 41Ra as shown in FIG. 5(C).

As shown in FIG. 6, at a time t62 when the predetermined time Ton elapses from the time t61 of starting the lighting of the second display part 41Rb, the embodiment apparatus starts a lighting of the third display part 41Rc while continuing the lighting of the first and second display parts 41Ra and 41Rb as shown in FIG. 5(D).

As shown in FIG. 6, at a time t63 when the predetermined time Ton elapses from the time t62 of starting the lighting of the third display part 41Rc, the embodiment apparatus stops the lighting of the first to third display parts 41Ra to 41Rc as shown in FIG. 5(A).

Thereafter, the embodiment apparatus repeatedly performs an attention lighting operation for sequentially lighting the first to third display parts 41Ra to 41Rc at a predetermined time interval Toff while the attention display condition continues to be satisfied for the attention target existing ahead of the vehicle 100 on the right.

It should be noted that it takes a predetermined display time Ttotal for the embodiment apparatus to complete one attention lighting operation for sequentially lighting the first to third display parts 41Ra to 41Rc.

Similarly, at a time when the attention display condition is satisfied for the attention target existing ahead of the vehicle 100 on the left, the embodiment apparatus starts a lighting of the first display part 41La of the left display part 41L. At a time when the predetermined time Ton elapses from a time of starting the lighting of the first display part 41La, the embodiment apparatus starts a lighting of the second display part 41Lb while continuing the lighting of the first display part 41La. At a time when the predetermined time Ton elapses from a time of starting the lighting of the second display part 41Lb, the embodiment apparatus starts a lighting of the third display part 41Lc while continuing the lighting of the first and second display parts 41La and 41Lb. At a time when the predetermined time Ton elapses from a time of starting the lighting of the third display part 41Lc, the embodiment apparatus stops the lighting of the first to third display parts 41La to 41Lc.

Thereafter, the embodiment apparatus repeatedly performs an attention lighting operation for sequentially lighting the first to third display parts 41La to 41Lc at the predetermined time interval Toff while the attention display condition continues to be satisfied for the attention target existing ahead of the vehicle on the left.

It should be noted that it takes the predetermined display time Ttotal for the embodiment apparatus to complete one attention lighting operation for sequentially lighting the first to third display parts 41La to 41Lc.

Similarly, at a time when the attention display condition is satisfied for the attention target existing in front of the vehicle 100, the embodiment apparatus starts a lighting of the first display part 41Fa of the front display part 41F. At a time when the predetermined time Ton elapses from a time of starting the lighting of the first display part 41Fa, the embodiment apparatus starts a lighting of the second display part 41Fb while continuing the lighting of the first display part 41Fa. At a time when the predetermined time Ton elapses from a time of starting the lighting of the 41Fb, the embodiment apparatus starts a lighting of the third display part 41Fc while continuing the lighting of the first and second display parts 41Fa and 41Fb. At a time when the predetermined time Ton elapses from a time of starting the lighting of the third display part 41Fc, the embodiment apparatus stops the lighting of the first to third display parts 41Fa to 41Fc.

Thereafter, the embodiment apparatus repeatedly performs an attention lighting operation for sequentially lighting the first to third display parts 41Fa to 41Fc at the predetermined time interval Toff while the attention display condition continues to be satisfied for the attention target existing in front of the vehicle 100.

It should be noted that it takes the predetermined display time Ttotal for the embodiment apparatus to complete one attention lighting operation for sequentially lighting the first to third display parts 41Fa to 41Fc.

The driver can be informed of the existence of the attention target and the driver's attention can be drawn by the attention display operation.

When the target in-between time TTC becomes longer than the first threshold time TTC1 after the attention display operation starts to be performed, the attention display condition becomes unsatisfied. Further, when the lateral distance DL becomes longer than the first threshold distance DL1 after the attention display operation starts to be performed, the attention display condition becomes unsatisfied. Furthermore, when the attention target disappears after the attention display operation starts to be performed, the attention display condition becomes unsatisfied. When the attention lighting operation is completed at a time of the attention display condition becoming unsatisfied, the embodiment apparatus terminates the attention display operation. On the other hand, when the attention lighting operation is not completed at the time of the attention display condition becoming unsatisfied, the embodiment apparatus continues to perform the attention lighting operation. When the embodiment apparatus completes the attention lighting operation, the embodiment apparatus terminates the attention display operation.

<Attention Alert Operation>

Further, the embodiment apparatus determines whether an attention alert condition that the target in-between time TTC is shorter than or equal to a second threshold time TTC2 shorter than the first threshold time TTC1 and the lateral distance DL is shorter than or equal to a second threshold distance DL2 shorter than the first threshold distance DL1, is satisfied.

When the attention alert condition is satisfied, the embodiment apparatus performs an attention alert operation for causing the buzzer 51 to generate the alert sound, thereby informing the driver of the vehicle 100 of the existence of the attention target around the vehicle 100. Thereby, the driver can be informed of the existence of the attention target around the vehicle 100 and the driver's attention can be drawn.

When the target in-between time TTC becomes longer than the second threshold time TTC2 after the attention alert operation starts to be performed, the attention alert condition becomes unsatisfied. Further, when the lateral distance DL becomes longer than the second threshold distance DL2 after the attention alert operation starts to be performed, the attention alert condition becomes unsatisfied. Furthermore, when the attention target disappears after the attention alert operation starts to be performed, the attention alert condition becomes unsatisfied. When the attention alert condition becomes unsatisfied, the embodiment apparatus terminates the attention alert operation.

<Forced-Braking Operation>

Further, the embodiment apparatus determines whether a forced-braking condition that the target in-between time TTC is shorter than or equal to a third threshold time TTC3 (i.e., a forced-braking start threshold time) shorter than the second threshold time TTC2 and the lateral distance DL is shorter than or equal to a third threshold distance DL3 (i.e., a forced-braking start threshold distance) shorter than the second threshold distance DL2, is satisfied. The third threshold time TTC3 is set to a time capable of stopping the vehicle 100 before the distance DO between the vehicle 100 and the attention target becomes zero after the target in-between time TTC becomes the third threshold time TTC3 and thus, the forced-braking operation starts to be performed.

When the forced-braking condition is satisfied, the embodiment apparatus performs an AOR forbiddance operation for actuating the engine actuators 21 such that the intake air amount becomes generally zero and an amount of injected fuel becomes zero, independently of a value of the acceleration pedal operation amount AP, that is, forbidding an acceleration override and a forced-braking operation for actuating the brake actuators 31 such that a predetermined braking force is applied to each of the wheels 101 and 102 from the hydraulic brake mechanism 32, independently of a value of the brake pedal operation amount BP. Thereby, the vehicle 100 is prevented from colliding against the attention target.

When the target in-between time TTC becomes longer than the third threshold time TTC3 after the forced-braking operation starts to be performed, the forced-braking condition becomes unsatisfied. Further, when the lateral distance DL becomes longer than the third threshold distance DL3 after the forced-braking operation starts to be performed, the forced-braking condition becomes unsatisfied. Furthermore, when the attention target disappears after the forced-braking operation starts to be performed, the forced-braking condition becomes unsatisfied. When the forced-braking condition becomes unsatisfied, the embodiment apparatus continues to perform the forced-braking operation until the vehicle 100 stops. When the vehicle 100 stops, the embodiment apparatus terminates the forced-braking operation.

The embodiment apparatus may start to perform the forced-braking operation while the attention display operation is performed. In this case, when the attention display condition becomes unsatisfied while the forced-braking operation is performed, the embodiment apparatus continues to perform the attention display operation. Then, the embodiment apparatus terminates the attention display operation when the embodiment apparatus terminates the forced-braking operation.

Similarly, the attention alert condition may become unsatisfied when the forced-braking operation is performed. Also, in this case, when the attention alert condition becomes unsatisfied while the forced-braking operation is performed, the embodiment apparatus continues to perform the attention alert operation. Then, the embodiment apparatus terminates the attention alert operation when the embodiment apparatus terminates the forced-braking operation.

When the vehicle 100 approaches a crossing considerably, the walking person may appear at an entrance of the crossing. In this case, the walking person may be first detected as the attention target when the vehicle 100 approaches the walking person considerably. Further, there may be a building between the vehicle 100 and the walking person. In this case, the walking person may be first detected as the attention target when the vehicle 100 approaches the building considerably. Furthermore, a walking direction of the walking person may change. In this case, the walking person may be first detected as the attention target when the vehicle 100 approaches the walking person considerably.

In this regard, as shown in FIG. 6, it takes the predetermined display time Ttotal (=Ton·3) for one attention lighting operation to be completed. Thus, when the vehicle 100 approaches the walking person considerably and the, the walking person is first set as the attention target, the target in-between time TTC acquired at a time of the walking person being set as the attention target, may be considerably shorter than the first threshold time TTC1 (i.e., the predetermined display time Ttotal). In this case, if the attention display operation starts to be performed at the time of the walking person being set as the attention target, the vehicle 100 may pass the attention target before the first attention lighting operation is completed. Therefore, the attention lighting operation continues to be performed after the vehicle 100 passes the attention target. In this case, the driver may feel the discomfort.

In the embodiment apparatus, a time shorter than the first threshold time TTC1 and longer than or equal to the predetermined display time Ttotal necessary for the attention lighting operation to be completed, is set as a lower limit threshold time TTClow. The embodiment apparatus is configured not to start to perform the attention display operation when the target in-between time TTC acquired at a time of the attention display condition being satisfied, is shorter than the lower limit threshold time TTClow.

Thereby, when the target in-between time TTC is shorter than the lower limit threshold time TTClow, the attention display operation is not performed. Therefore, the vehicle 100 is unlikely to have passed the attention target when the driver knows the attention display. Thus, the driver is unlikely to feel the discomfort.

<Concrete Operation Of Embodiment Apparatus>

Figure 7:
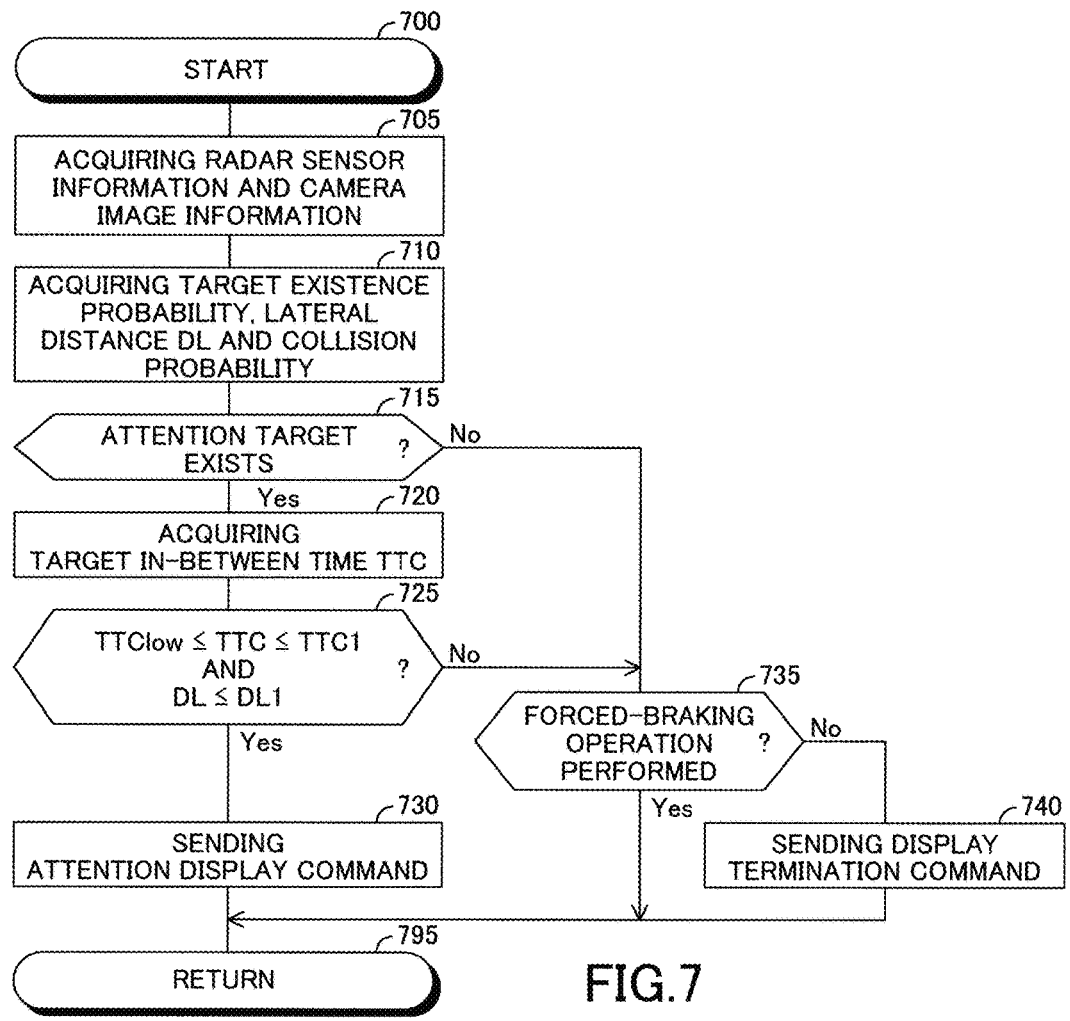
FIG. 7 is a view for showing a flowchart of a routine executed by a CPU of a driving assist ECU shown in FIG. 1.

Below, a concrete operation of the embodiment apparatus will be described. The CPU of the driving assist ECU 10 of the embodiment apparatus is configured or programmed to execute a routine shown by a flowchart in FIG. 7 each time a predetermined time elapses. At a predetermined timing, the CPU starts a process from a step 700 of FIG. 7 and then, proceeds with the process to a step 705 to acquire the radar sensor information and the camera image information stored in the RAM of the driving assist ECU 10.

Next, the CPU proceeds with the process to a step 710 to acquire the object existence probability, the lateral distance DL and the collision probability on the basis of the radar information and the camera image information acquired at the step 705. Next, the CPU proceeds with the process to a step 715 to determine whether the object is the attention target on the basis of the object existence probability, the lateral distance DL, the collision probability and the like. When the object is the attention target, the CPU determines "Yes" at the step 715 and then, proceeds with the process to a step 720 to calculate or acquire the target in-between time TTC.

Next, the CPU proceeds with the process to a step 725 to determine whether the target in-between time TTC is larger than or equal to the lower limit threshold time TTClow and smaller than or equal to the first threshold time TTC1 and the lateral distance DL is smaller than or equal to the first threshold distance DL1.

When the target in-between time TTC is larger than or equal to the lower limit threshold time TTClow and smaller than or equal to the first threshold time TTC1 and the lateral distance DL is smaller than or equal to the first threshold distance DL1, the CPU determines "Yes" at the step 725 and then, proceeds with the process to a step 730.

When the CPU proceeds with the process to the step 730, the CPU sends an attention display command to the display ECU 40 (i.e., provides the display ECU 40 with the attention display command) and then, proceeds with the process to a step 795 to terminate this routine once. When the display ECU 40 receives the attention display command, the display ECU 40 causes the display device 41 to perform the attention display operation.

On the other hand, when the target in-between time TTC is smaller than the lower limit threshold time TTClow, or the target in-between time TTC is larger than the first threshold time TTC1, or the lateral distance DL is larger than the first threshold distance DL1 at a time of the CPU executing the process of the step 725, the CPU determines "No" at the step 725 and then, proceeds with the process to a step 735.

When the CPU proceeds with the process to the step 735, the CPU determines whether the forced-braking operation is performed. When the forced-braking operation is performed, the CPU determines "Yes" at the step 735 and then, proceeds with the process to the step 795 to terminate this routine once. When the attention display operation is performed at a time of the CPU determining "Yes" at the step 735, the CPU continues to perform the attention display operation. In this case, the CPU sends a display termination command to the display ECU 40 (i.e. provides the display ECU 40 with the display termination command) to terminate the attention display operation when the vehicle 100 is stopped by the forced-braking operation.

On the other hand, when the forced-braking operation is not performed, the CPU determines "No" at the step 735 and then, proceeds with the process to a step 740 to send the display termination command to the display ECU 40. Then, the CPU proceeds with the process to the step 795 to terminate this routine once. When the display ECU 40 performs the attention display operation at a time of receiving the display termination command, the display ECU 40 terminates the attention display operation as described above.

When the object is not the attention target at a time of the CPU executing the process of the step 715, the CPU determines "No" at the step 715 and then, proceeds with the process to the step 735.

Figure 8:
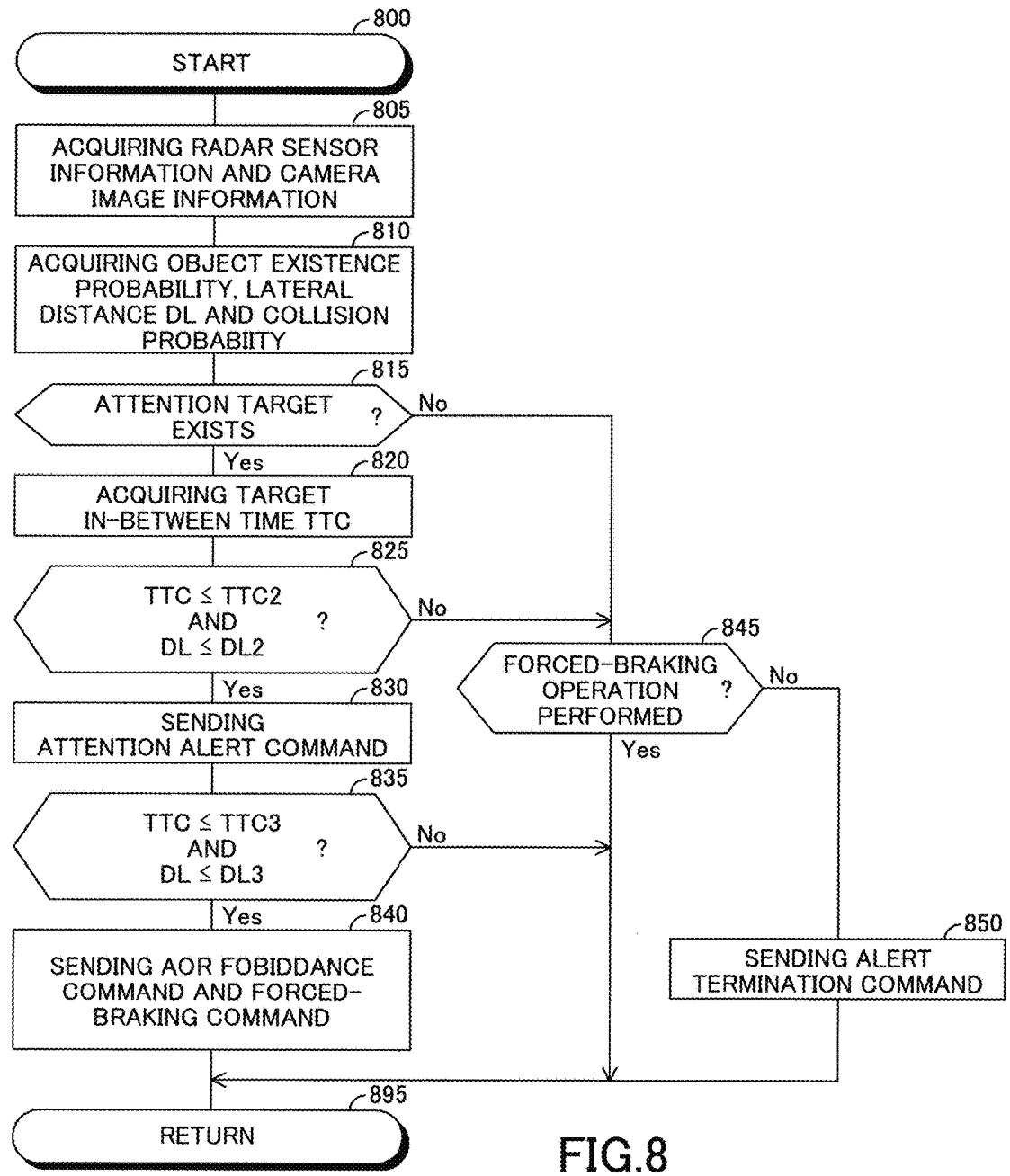
FIG. 8 is a view for showing a flowchart of a routine executed by the CPU.

Further, the CPU of the driving assist ECU 10 is configured or programmed to execute a routine shown by a flowchart in FIG. 8 each time the predetermined time elapses. At a predetermined timing, the CPU starts a process from a step 800 of FIG. 8 and then, proceeds with the process to a step 805 to acquire the radar sensor information and the camera image information from the RAM of the driving assist ECU 10.

Then, the CPU proceeds with the process to a step 810 to acquire the object existence probability, the lateral distance DL and the collision probability on the basis of the radar sensor information and the camera image information acquired at the step 805. Then, the CPU proceeds with the process to a step 815 to determine whether the object is the attention target on the basis of the object existence probability, the lateral distance DL, the collision probability and the like.

When the object is the attention target, the CPU determines "Yes" at the step 815 and then, proceeds with the process to a step 820 to calculate or acquire the target in-between time TTC. Then, the CPU proceeds with the process to a step 825 to determine whether the target in-between time TTC is smaller than or equal to the second threshold time TTC2 and the lateral distance DL is smaller than or equal to the second threshold distance DL2. In other words, the CPU determines whether the attention alert condition is satisfied at the step 825. When the target in-between time TTC is smaller than or equal to the second threshold time TTC2 and the lateral distance DL is smaller than or equal to the second threshold distance DL2, the CPU determines "Yes" at the step 825 and then, proceeds with the process to a step 830.

When the CPU proceeds with the process to the step 830, the CPU sends an attention alert command to the alert ECU 50 (i.e., provides the alert ECU 50 with the attention alert command). When the alert ECU 50 receives the attention alert command, the alert ECU 50 causes the buzzer 51 to perform the attention alert operation as described above.

Then, the CPU proceeds with the process to a step 835 to determine whether the target in-between time TTC is smaller than or equal to the third threshold time TTC3 and the lateral distance DL is smaller than or equal to the third threshold distance DL3. In other words, the CPU determines whether the forced-braking condition is satisfied at the step 835. When the target in-between time TTC is smaller than or equal to the third threshold time TTC3 and the lateral distance DL is smaller than or equal to the third threshold distance DL3, the CPU determines "Yes" at the step 835 and then, proceeds with the process to a step 840.

When the CPU proceeds with the process to the step 840, the CPU sends an acceleration override forbiddance command (i.e., an AOR forbiddance command) to the engine ECU 20 (i.e., provides the engine ECU 20 with the AOR forbiddance command) and a forced-braking command to the brake ECU 30 (i.e., provides the brake ECU 30 with the forced-braking command). Then, the CPU proceeds with the process to a step 895 to terminate this routine once.

When the engine ECU 20 receives the AOR forbiddance command, the engine ECU 20 controls the activation of the engine actuators 21 such that the opening degree TA of the throttle valve becomes generally zero and an injection of the fuel from the fuel injectors is stopped, independently of the value of the acceleration pedal operation amount AP.

On the other hand, when the brake ECU 30 receives the forced-braking command, the brake ECU 30 performs the forced-braking operation for controlling the activation of the brake actuators 31 such that the predetermined friction braking force is applied to the wheels 101 and 102 from the hydraulic brake mechanism 32, independently of the value of the brake pedal operation amount BP.

When the target in-between time TTC is larger than the third threshold time TTC3 or the lateral distance DL is larger than the third threshold distance DL3 at a time of the CPU executing the process of the step 835, the CPU determines "No" at the step 835 and then, proceeds with the process directly to the step 895 to terminate this routine once.

When the target in-between time TTC is larger than the second threshold time TTC2 or the lateral distance DL is larger than the second threshold distance DL2 at a time of the CPU executing the process of the step 825, the CPU determines "No" at the step 825 and then, proceeds with the process to a step 845.

When the CPU proceeds with the process to the step 845, the CPU determines whether the forced-braking operation is performed. When the forced-braking operation is performed, the CPU determines "Yes" at the step 845 and then, proceeds with the process to the step 895 to terminate this routine once. In this case, the CPU sends supplies an alert termination command to the alert ECU 50 (i.e., provides the alert ECU 50 with the alert termination command) to terminate the attention alert operation when the vehicle 100 is stopped by the forced-braking operation.

On the other hand, when the forced-braking operation is not performed, the CPU determines "No" at the step 845 and then, proceeds with the process to a step 850 to send the alert termination command to the alert ECU 50 (i.e., provides the alert ECU 50 with the alert termination command). Then, the CPU proceeds with the process to the step 895 to terminate this routine once.

When the alert ECU 50 performs the attention alert operation at a time of receiving the alert termination command, the alert ECU 50 terminates the attention alert operation.

When the object is not the attention target at a time of the CPU executing the process of the step 815, the CPU determines "No" at the step 815 and then, proceeds with the process to the step 845.

The concrete operation of the embodiment apparatus has been described. According to the concrete operation of the embodiment apparatus, the vehicle 100 is unlikely to have passed the attention target when the driver knows the attention display (see a determination "No" at the step 725 of FIG. 7). Thus, the driver is unlikely to feel the discomfort.

It should be noted that the present invention is not limited to the aforementioned embodiment and various modifications can be employed within the scope of the present invention.

For example, the embodiment apparatus may be configured to determine whether the attention display operation should be performed, only using the camera image information output from the camera device 15. Similarly, the embodiment apparatus may be configured to determine whether the attention alert operation should be performed, only using the camera image information output from the camera device 15. Similarly, the embodiment apparatus may be configured to determine whether the forced-braking operation should be performed, only using the camera image information output from the camera device 15.

The embodiment apparatus considers the lateral distance DL when the embodiment apparatus determines whether the object is the attention target. Therefore, in the embodiment apparatus, the attention display condition may not include a condition that the lateral distance DL is smaller than or equal to the first threshold distance DL1. Similarly, the attention alert condition may not include a condition that the lateral distance DL is smaller than or equal to the second threshold distance DL2 and the forced-braking condition may not include a condition that the lateral distance DL is smaller than or equal to the third threshold distance DL3.

The attention display operation is not limited to the operation described with reference to FIG. 5. For example, the right display part 41R may be an arrow-like shape. In this case, the attention display operation may be performed such that a point portion of the right display part 41R elongates gradually for a predetermined display time.

What is claimed is:

1. A vehicle driving assist apparatus, comprising:
    an object detection device for detecting an object existing around a vehicle and acquiring object information corresponding to information on a position and a speed of the object with respect to the vehicle;
    a display device for performing an attention display operation for informing a driver of the vehicle of an existence of a target corresponding to the object to be informed to the driver of the vehicle, the attention display operation taking a predetermined display time for completing one attention display operation; and
    an electric control unit for providing the display device with an attention display command for causing the display device to perform the attention display operation,
    wherein the electric control unit is configured:
    to determine whether the target exists around the vehicle, using the object information;
    to estimate a predicted reaching time necessary for the vehicle to reach the target, using the object information when the electric control unit first determines that the target exists around the vehicle;
    to provide the display device with the attention display command when an attention condition that the predicted reaching time is larger than a lower limit threshold time and smaller than or equal to a display start threshold time is satisfied, the lower limit threshold time being larger than or equal to the predetermined display time and the display start threshold time being larger than the lower limit threshold time; and not to provide the display device with the attention display command when the attention display condition is not satisfied.

2. The vehicle driving assist apparatus according to claim 1, wherein the attention condition includes a condition that a lateral distance between the target and a line extending in a longitudinal direction of the vehicle is shorter than or equal to a display start threshold distance, and
    the electric control unit is configured to determine whether the lateral distance is shorter than or equal to the display start threshold distance, using the object information.

3. The vehicle driving assist apparatus according to claim 2, wherein the electric control unit is configured:
    to determine whether a forced-braking condition that the predicted reaching time is shorter than or equal to a forced-braking start threshold time shorter than the display start threshold time, using the object information; and
    to perform a forced-braking operation for causing a braking device of the vehicle to apply a braking force to the vehicle to stop the vehicle when the electric control unit determines that the forced-braking condition is satisfied.

4. The vehicle driving assist apparatus according to claim 3, wherein the forced-braking condition includes a condition that the lateral distance is shorter than or equal to a forced-braking start threshold distance shorter than the display start threshold distance, and
    the electric control unit is configured to determine whether the lateral distance is shorter than or equal to the forced-braking start threshold distance, using the object information.

5. The vehicle driving assist apparatus according to claim 3, wherein the electric control unit is configured to continue to perform the attention display operation until the vehicle stops when the forced-braking operation is performed even though the attention condition becomes unsatisfied after the attention display operation starts to be performed.

* * * * *